(12) United States Patent
Bruckert et al.

(10) Patent No.: US 9,526,927 B2
(45) Date of Patent: Dec. 27, 2016

(54) BREATHING ASSEMBLY FOR AIRCRAFT WITH STRENGTHENED MASK SECURING DEVICE

(75) Inventors: Sebastien Bruckert, Auxonne (FR); Philippe Gerard, Beynes (FR); Didier Lamourette, Les Essarts le Roi (FR); Frederic Berthet, Saulx-Marchais (FR)

(73) Assignee: Zodiac Aerotechnics, Plaisir (FR)

( * ) Notice: Subject to any disclaimer, the term of this patent is extended or adjusted under 35 U.S.C. 154(b) by 917 days.

(21) Appl. No.: 13/881,393

(22) PCT Filed: Dec. 23, 2010

(86) PCT No.: PCT/IB2010/003511
§ 371 (c)(1),
(2), (4) Date: Apr. 25, 2013

(87) PCT Pub. No.: WO2012/085616
PCT Pub. Date: Jun. 28, 2012

(65) Prior Publication Data
US 2013/0213403 A1  Aug. 22, 2013

(51) Int. Cl.
*A62B 25/00* (2006.01)
*A62B 7/14* (2006.01)
(Continued)

(52) U.S. Cl.
CPC ............ *A62B 25/00* (2013.01); *A62B 7/14* (2013.01); *A62B 25/005* (2013.01); *B64D 10/00* (2013.01);
(Continued)

(58) Field of Classification Search
CPC ..... A62B 18/084; A62B 25/00; A62B 25/005; A62B 7/14; A62B 9/02; B64D 10/00; B64D 11/00; B64D 11/06; B64D 11/0689; B64D 13/00; B64D 2231/025; B64D 25/00; F16K 31/44
(Continued)

(56) References Cited

U.S. PATENT DOCUMENTS 4,154,237 A * 5/1979 Courter ............... B64D 11/00
128/202.13
9,168,348 B2 * 10/2015 Hieber .................. A61M 16/06
(Continued)

FOREIGN PATENT DOCUMENTS

WO 9002582 A1 3/1990
WO WO/99/07442 A2 2/1999
(Continued)

OTHER PUBLICATIONS

International Search Report and Written Opinion dated Sep. 22, 2011 in Application No. PCT/IB2010/003511.

*Primary Examiner* — Annette Dixon
(74) *Attorney, Agent, or Firm* — Kilpatrick Townsend & Stockton LLP; Dean W. Russell; Kristin M. Crall (57) ABSTRACT

A breathing assembly for aircraft comprising a storage unit, a breathing mask and a releasable securing device. The storage unit has a guiding surface extending perpendicularly to an elevation direction and a maintaining element. The breathing mask comprises a rigid support having a sliding surface adapted to slide in contact with the guiding surface of the storage unit, along a sliding direction between a storage position and an exit position. The support further has a maintaining element. In the storage position, the sliding surface of the support is prevented from moving away from the guiding surface of the storage unit along the elevation direction at the distal end by engagement of the maintaining element of the support with the maintaining element of the storage unit.

22 Claims, 9 Drawing Sheets

(51) Int. Cl.
*B64D 11/00* (2006.01)
*B64D 10/00* (2006.01)
*B64D 11/06* (2006.01)

(52) U.S. Cl.
CPC ..... *B64D 11/0689* (2013.01); *B64D 2231/025* (2013.01)

(58) Field of Classification Search
USPC ............. 128/202.13, 205.13, 205.24, 205.25
See application file for complete search history.

(56) References Cited

U.S. PATENT DOCUMENTS

2002/0189617 A1* 12/2002 Cordero ............... A62B 25/005
128/205.25
2005/0263156 A1* 12/2005 Westphal ............... B64D 25/00
128/205.25

FOREIGN PATENT DOCUMENTS

WO 2009007794 A1 1/2009
WO WO/2009/007794 A1 1/2009

\* cited by examiner

BREATHING ASSEMBLY FOR AIRCRAFT WITH STRENGTHENED MASK SECURING DEVICE

CROSS REFERENCE TO RELATED APPLICATION

This application is the U.S. national phase of International Application No. PCT/IB2010/003511 filed on Dec. 23, 2010, and published in English by the World Intellectual Property Organization on Jun. 28, 2012 as International Publication No. WO 2012/085616 A1, the entire contents of which are incorporated herein by reference.

FIELD OF THE INVENTION

The invention relates to a breathing assembly essentially comprising a breathing mask and a storage unit for aircraft. Such a breathing assembly is generally placed in a cabin of a civil aircraft and intended to be used by a crew member, generally one of the pilots.

BACKGROUND OF THE INVENTION

Due to aviation regulations, the pilot has to don a breathing mask in some circumstances and has to be able to don the breathing mask within a five second period following an incident occurrence. Therefore, the storage unit has to be placed near the pilot. The storage unit is sometimes fastened to a wall of the cabin. Advantageously, the storage unit is mounted on a seat next to the headrest of the seat.

So, the breathing mask must be secured to the storage unit, even in severe conditions, such as very high acceleration or deceleration, due in particular to a crash, in order to prevent the breathing mask from being thrown into the cabin and possibly hitting the pilot.

Document WO 2009/007794 discloses a breathing assembly for aircraft comprising:
- a storage unit to be fixed to the aircraft, having a receptacle and an opening, the storage unit further having a guiding surface extending perpendicularly to an elevation direction,
- a breathing mask to be donned by an aircraft crewmember, the breathing mask comprising a rigid support having a sliding surface adapted to slide in contact with the guiding surface of the storage unit, along a sliding direction, between a storage position and an exit position, the sliding direction being perpendicular to the elevation direction, the support extends along the sliding direction between a proximal end—proximate the opening—and a distal end—at the opposite of the opening along the sliding direction—, and
- a releasable securing device having a secure state and a release state, wherein when in the secure state the securing device prevents the support from sliding from the storage position towards the exit position and when in the release state the securing device allows the support to slide from the storage position towards the exit position.

SUMMARY OF THE INVENTION

The purpose of this invention is to reduce the risk that the breathing mask unwittingly leaves the storage unit.

For this purpose, according to the invention the support further has at least one maintaining element disposed at the distal end of the support along the sliding direction, the storage unit further has a maintaining element and, in the storage position, the sliding surface of the support is prevented from moving away from (maintained in contact with) the guiding surface of the storage unit along the elevation direction at the distal end by engagement of the maintaining element of the support with the maintaining element of the storage unit.

Thus, movement of the breathing mask relative to the storage unit is reduced, except along the sliding direction. Therefore, the efficiency of the securing device is improved without substantially impeding the sliding of the breathing mask when the user wants to remove the breathing mask from the storage unit. Moreover, this solution avoids increasing the strength of the securing device which would have substantially increased the weight of the breathing mask and would have required more strength to the pilot to place it in the release state.

According to another feature in accordance with the invention, preferably the maintaining element of the support engages the maintaining element of the storage unit along a maintaining length along the sliding direction, and the storage position is spaced from the exit position by a distance at least three times as long as said maintaining length.

Thus, the breathing mask can be tightly maintained relative to the storage unit in the storage position without substantially increasing the friction between the support and the storage unit during sliding of the support between the storage position and the exit position.

According to another feature in accordance with the invention, the maintaining length is preferably lower than 15 millimeters, more preferably lower that 10 millimeters.

Thus, the friction between the support and the storage unit during sliding of the support between the storage position and the exit position is not substantially increased by the engagement of the maintaining element of the support with the maintaining element of the storage unit.

According to another feature in accordance with the invention, in the storage position, along the elevation direction, preferably a clearance lower than 0.5 millimeter, more preferably lower than 0.1 millimeter is placed between the maintaining element of the support and the maintaining element of the storage unit.

Thus, the support is accurately maintained relative to the storage unit in the storage position without requiring low dimensional tolerances and without creating high friction between the support and the storage unit in the storage position.

According to another feature in accordance with the invention, preferably the securing device comprises a lever and a protruding portion and, in the storage position of the support and in the secure state of the securing device, the lever has an abutment portion which abuts against the protruding portion along the sliding direction.

Thus, the user can easily move the securing device between the secure state and the release state, and the securing device efficiently secures the support to the storage when it is in its secure state.

According to supplementary feature in accordance with the invention, preferably in the storage position of the support and in the secure state of the securing device, the sliding surface of the support is prevented from moving away from the guiding surface of the storage unit along the elevation direction at the proximal end by engagement of the protruding portion with the lever.

Thus, in the storage position, movement of the breathing mask relative to the storage unit is further reduced, without impeding the sliding of the support when the securing device is in the release state.

In accordance with the invention, the breathing assembly preferably further has the following supplementary characteristics:

the abutment portion of the lever has an edge extending substantially parallel to an edge of the protruding portion, in the secure state of the securing device, along the sliding direction, the edge of the abutment portion of the lever faces the protruding portion and the edge of the protruding portion faces the abutment portion of the lever, and in the secure state of the securing device, in cross section perpendicular to the sliding direction, the whole edge of the abutment portion of the lever is separated by at least 1 millimeter from the edge of the protruding portion.

Thus, the risk that a part of the edge of the abutment portion of the lever is aside instead of being opposite to the protruding portion due to the deformation under high deceleration is substantially reduced. The applicant has noticed that when a part of the edge of the abutment portion of the lever is on the side of the protruding portion, the lever could be moved by the protruding portion towards the release state.

Another feature in accordance with the invention improving the reliability and the robustness of the securing device is that preferably the edge of the abutment portion of the lever has a length at least twice as long as a length of the edge of the protruding portion.

According to another feature in accordance with the invention, the guiding surface of the storage cup preferably comprises two distant portions connected one to the other through a rigid bridge.

Thus, the friction between the guiding surface of the storage unit and the sliding surface of the support is reduced while efficiently maintaining the support relative to the storage unit in the storage position.

According to another feature in accordance with the invention, preferably one amongst the maintaining element of the storage unit and the maintaining element of the support is a groove extending in the sliding direction and the other is a protrusion protruding in a transversal direction perpendicular to the sliding direction and to the elevation direction, the protrusion engaging the groove in the storage position.

This solution is simple and efficient.

According to another feature in accordance with the invention, preferably one amongst the maintaining element of the storage unit and the maintaining element of the support is a pin extending in the sliding direction and the other is a hole, and the pin is inserted in said hole when the rigid support is in the storage position.

This solution is simple and efficient.

According to the invention, the breathing assembly preferably further has the following characteristics:

the breathing assembly comprises at least:
two pins: a first pin and a second pin and,
two holes: a first hole and a second hole, and
in the storage position the first pin extends through the first hole and the second pin extends through the second hole, in the exit position the first pin extends away from the first hole and the second pin extends away from the second hole.

Thus, the first pin, the second pin, the first hole and the second hole prevent the breathing mask from rotating around the sliding direction relative to the storage unit when the breathing mask is in the storage position.

According to a supplementary feature in accordance with the invention, in the storage position, the first pin has a first length extending through the first hole and the second pin has a second length extending through the second hole, and the first length is preferably at least ten percent longer than the second length.

Therefore, insertion of the pins in the holes is made easier.

According to another supplementary feature, the breathing mask has preferably the following characteristics:

the first pin has a first external section which is circular, the first hole has a first internal section, and the second pin has a second external section which is circular, the second hole has a second internal section which is elongated (oblong) along a transversal direction perpendicular to the sliding direction and to the elevation direction.

Thus, the support is accurately maintained relative to the storage unit in the storage position without requiring low dimensional tolerances concerning the relative positioning of the first pin, the second pin, the first hole and the second hole in the transversal direction.

According to the invention, the breathing assembly preferably further has the following characteristics:

the pin has a cylindrical portion, a tip and a conical portion extending between the cylindrical portion and the tip, and the hole has a cylindrical portion surrounding the cylindrical portion of the pin when the support is in the storage position.

Thus, the insertion of the pin in the hole is made easier and the maintaining of the breathing mask relative to the support in the storage position is improved without requiring low dimensional tolerances.

According to another feature in accordance with the invention, preferably the pin is in metallic material and the support is in plastic material.

Thus, the rubbing (and the rubbing noise) of the pin against the hole of the support is reduced and the robustness of the breathing assembly is improved.

According to another feature in accordance with the invention, the pin is preferably tight fitted in a separate beam fixed to the storage unit.

This solution is simple, robust and not expansive.

According to another feature in accordance with the invention, preferably the support further has two bevelled lateral walls disposed on opposite sides of the support along a transversal direction perpendicular to the sliding direction and to the elevation direction, the storage unit further has two respective bevelled lateral walls and, in the storage position, the bevelled lateral walls of the support are parallel to and substantially in contact with the respective bevelled lateral walls of the storage unit.

Therefore, in the storage position, the support is also efficiently maintained relative to the storage unit along the transversal direction.

According to another feature in accordance with the invention, preferably the breathing assembly further comprises a seat and the storage unit is fixed to the seat.

Thus, the pilot can quickly catch the breathing mask in order to don it.

BRIEF DESCRIPTION OF THE DRAWINGS

Other features and advantages of the present invention will appear in the following detailed description, with reference to the appended drawings in which.

DETAILED DESCRIPTION OF THE INVENTION

Figure 1:
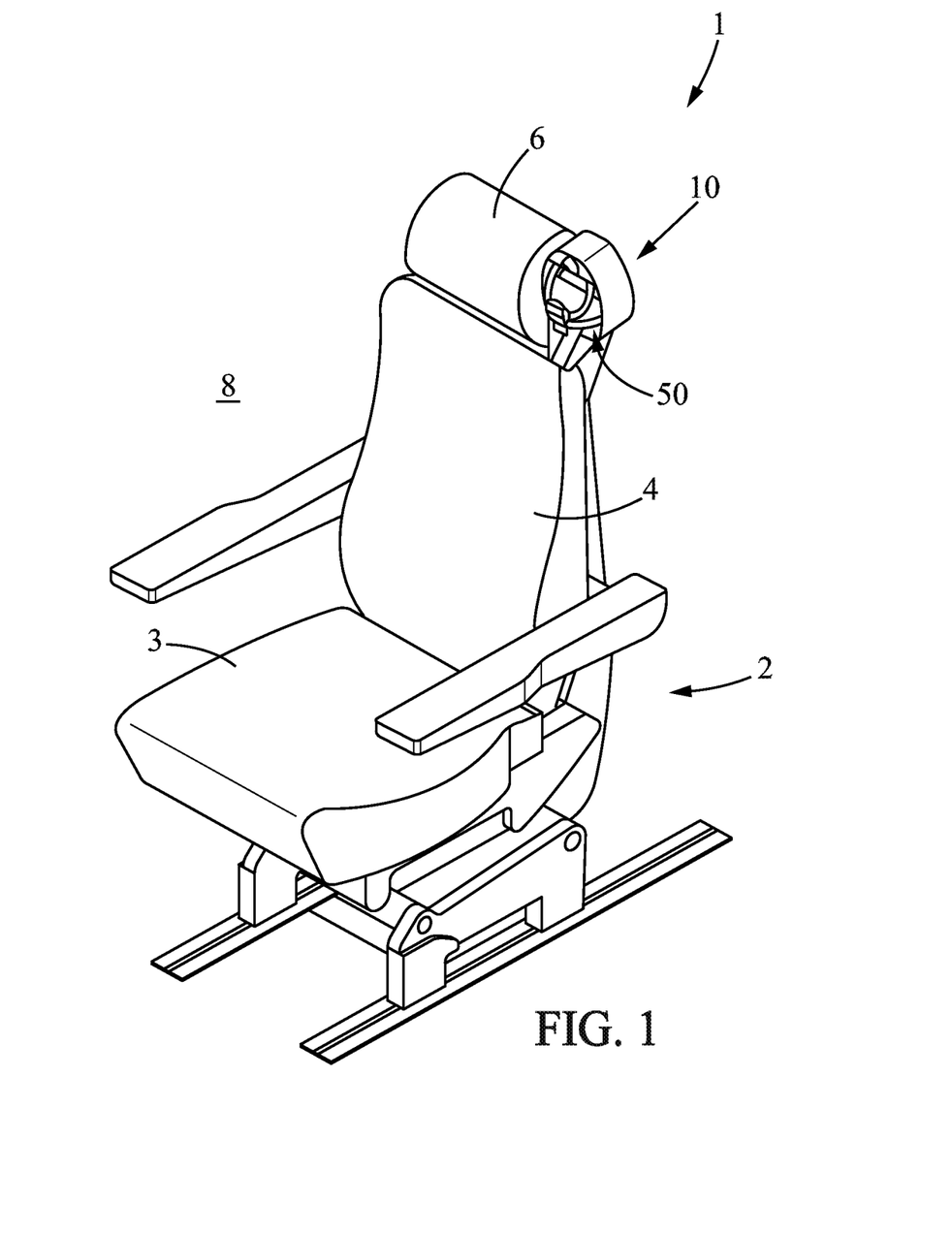
FIG. 1 shows in perspective a breathing assembly comprising a storage unit fixed to a seat and receiving a breathing mask.

FIG. 1 shows a breathing assembly 1 comprising a storage unit 10, a breathing mask 50 and a seat 2. The seat comprises a seat cushion 3, a backrest 4 and a headrest 6. The user of the breathing assembly 1, preferably an aircraft crewmember and usually the pilot, is intended to seat on the seat 2. As shown in particular in FIG. 2, the storage unit 10 has a substantially vertical back wall 18 having holes receiving screws (not represented) maintaining the storage unit 10 on the top of the backrest 4 and next to the headrest 6.

Figure 2:
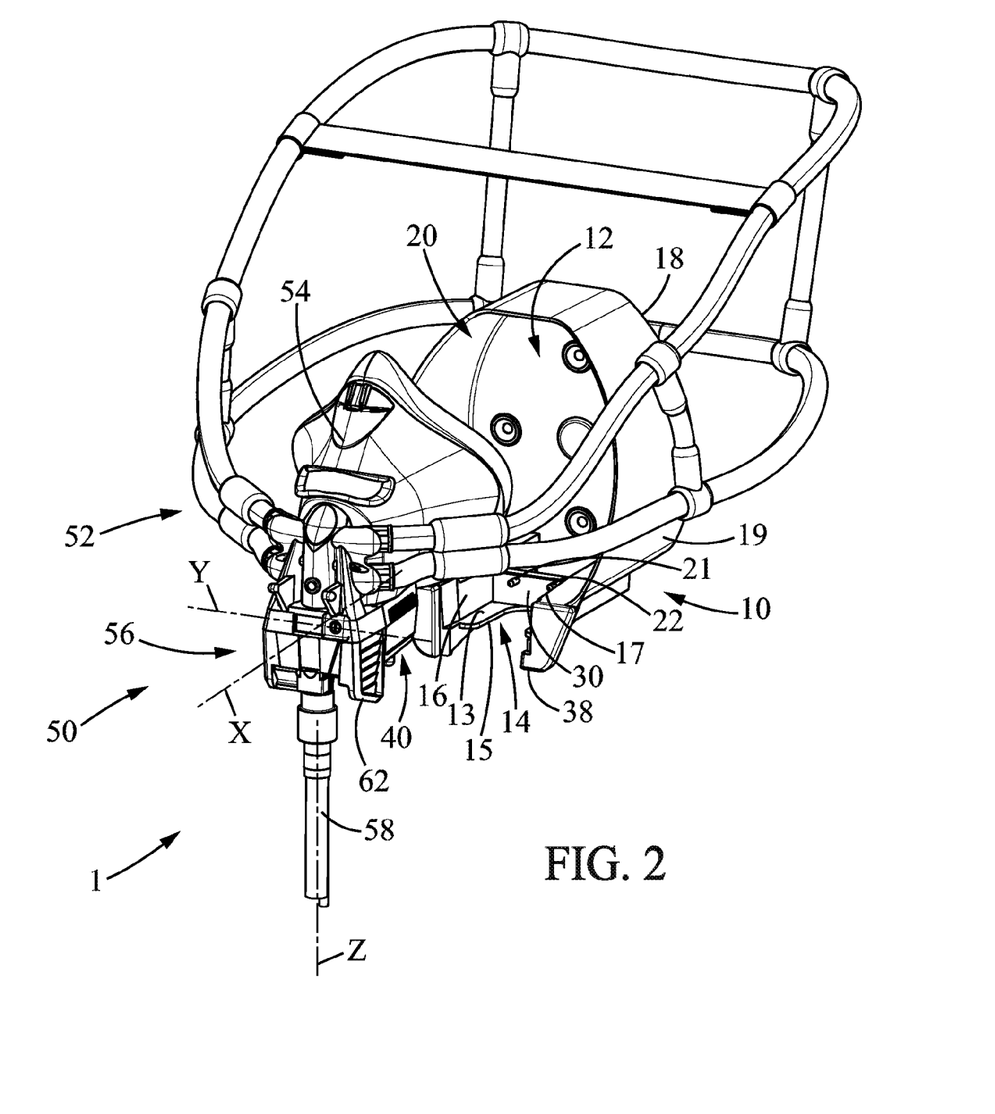
FIG. 2 shows at enlarged scale and in exploded perspective a first embodiment of a breathing assembly in accordance with the invention.

The storage unit 10 further comprises a peripheral wall 19. The storage unit forms a cup having a receptacle 12 delimited by the back wall 18 and the peripheral wall 19. The storage unit 10 has an opening 20 opposite the back wall 18 for inserting the breathing mask 30 into the receptacle 12 and extracting the breathing mask 30 from the receptacle 12. The peripheral wall 19 includes a guiding plate 14 and two bevelled lateral walls 16, 17.

The guiding plate 14 is flat, has a substantially constant thickness and extends substantially perpendicularly to an elevation direction Z which is substantially vertical. The guiding plate 14 has an upper surface 13 and a lower surface 15.

Figure 5:
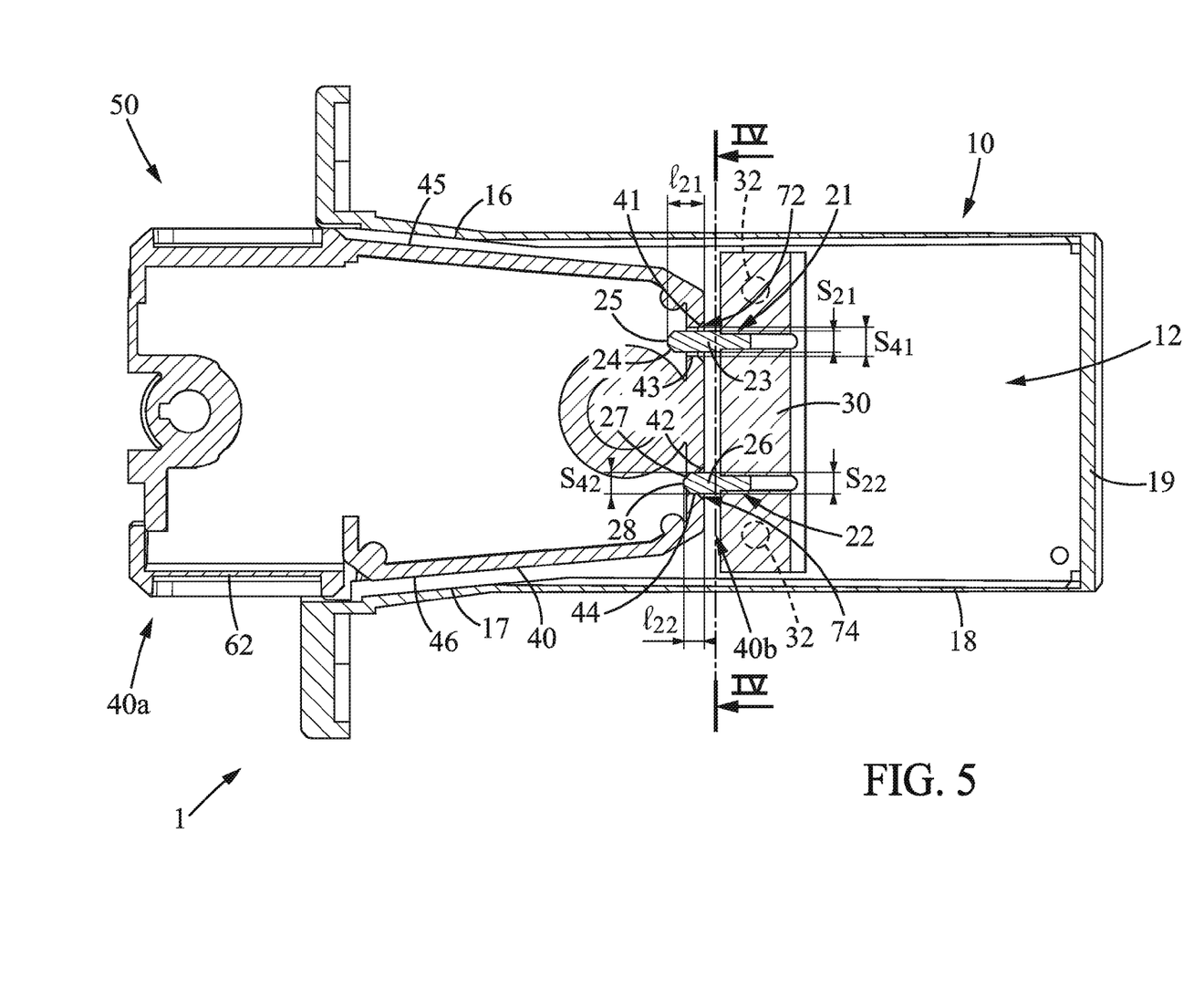
FIG. 5 shows the first embodiment of breathing assembly in section along the line referenced V-V in FIG. 4.

As shown in particular in FIGS. 2 and 5, the storage unit 10 further has a separate transversal beam 30 extending in a transversal direction Y perpendicular to the elevation direction Z. The transversal beam 30 is fixed to the guiding plate 14 by screws 32.

As shown in particular in FIG. 5, two pins 21, 22 are fixed to the transversal beam 30. The pins 21, 22 extend along a sliding direction X perpendicular to the transversal direction Y and to the elevation direction Z. Each of the pins 21, 22 comprises a cylindrical retaining portion 21a, 22a tight fitted, and preferably press fitted, into a respective cylindrical bore of the transversal beam 30.

As shown in particular in FIG. 5, the peripheral wall 19 of the storage unit 10 further has a notch 34 extending along the elevation direction Z and a protruding portion 38 which delimits the notch 34 in the sliding direction X.

It should be noticed that for clarity reasons in FIG. 5 only the peripheral wall of the support 40 is shown and internal channels connecting the supply duct 58 to the oronasal face piece 54 are omitted.

The breathing mask 50 has an oronasal face piece 54, an on-demand regulator 56 and a harness 52. The oronasal face piece 54 is intended to be placed on the face of the user, in communication with the nose and the mouth of the user in order to provide breathing gas for the user. The on-demand regulator 56 controls the flow of breathing gas provided to the user in accordance with the breath of the user. The on-demand regulator 56 also controls the concentration in oxygen of the breathing gas provided to the user through the oronasal face piece 54. The on-demand regulator 56 is provided with oxygen from a pressurised source (not represented) through a supply duct 58. The breathing mask 50 could be a full-face mask and therefore include an eye protection. The harness 52 is intended to press the oronasal face piece 54 on the user face in order to maintain the oronasal face piece 54.

The breathing mask 50 is intended to be received in the receptacle 12 of the storage unit 10 and firmly maintained in a storage position.

The on-demand regulator 56 includes a rigid casing 40 and a lever 62. The rigid casing forms housing and defines a support 40 which has a proximal (front) end 40a and a distal (back) end 40b along the sliding direction X. When the breathing mask 50 is in the storage position, the proximal end 40a can be caught by the user and is therefore outside the receptacle 12 or near the opening 20 whereas the distal end 40b is at the back of the receptacle 12.

Figure 6:
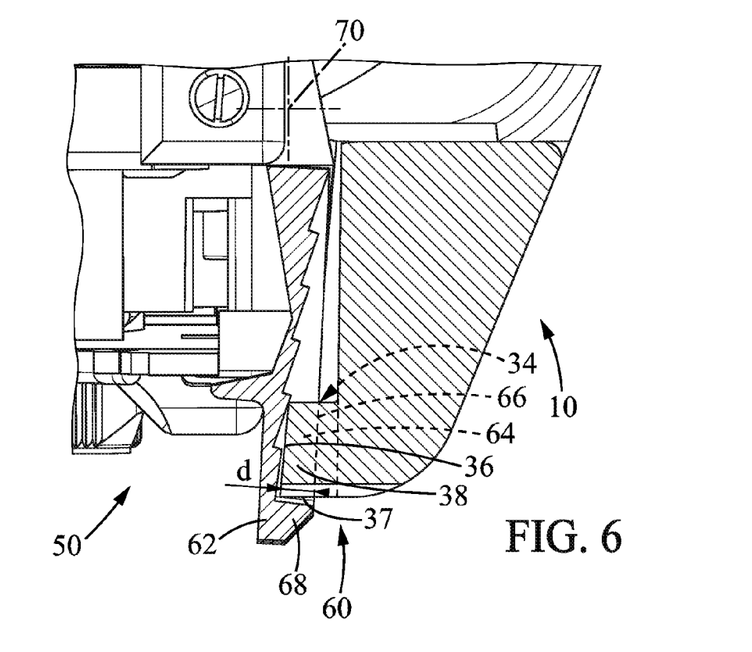
FIG. 6 shows the first embodiment of breathing assembly in section along the line referenced VI-VI in FIG. 3, with the securing device in secure state.
Figure 7:
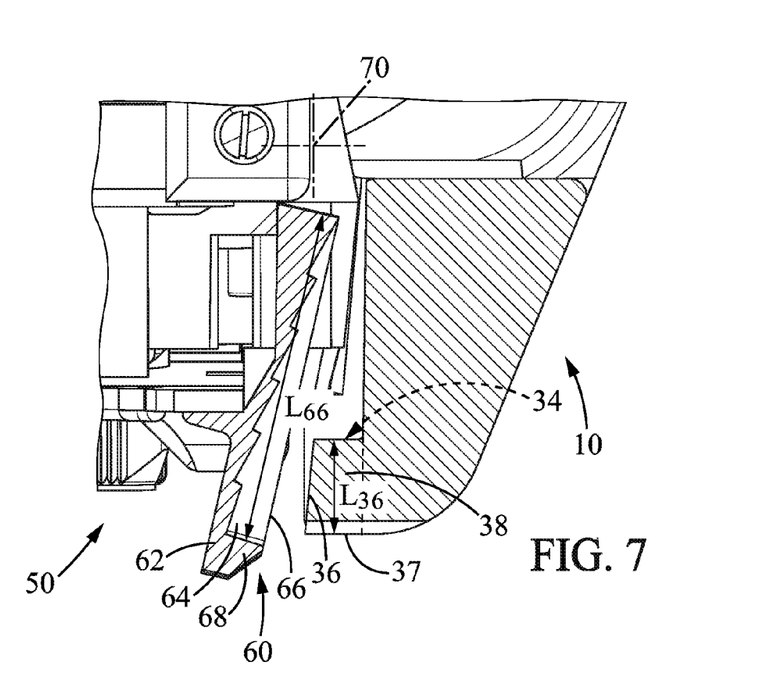
FIG. 7 shows the first embodiment of breathing assembly in section along the line referenced VI-VI in FIG. 3, with the securing device in release state.

The lever 62 is mounted on the support 40 proximate the proximal end 40a and is movable relative to the support 40 between a secure state and release state by rotation around a release axis 70 parallel to the sliding direction X, as shown in particular in FIGS. 6 and 7. The lever 62 is biased towards the secure state by a spring (not represented). In the release state of the lever 62, the harness 52 is provided with pressurised oxygen from the source, so that the harness 52 is inflated. In the secure state of the lever 62, the harness 52 is no more in communication with the source of oxygen and consequently deflates, at least partially. This function of the lever is well known and thus will not be described in details.

The oronasal face piece 54 is rigidly maintained on the support 40 which is slidingly mounted on the storage unit 10 between the storage position and an exit position. The breathing mask 1, and in particular the support 40, slides along the sliding direction X.

The support 40 has a lower surface 39. Between the storage position and the exit position, the lower surface 39 of the support 40 rests on the upper surface 13 of the guiding plate 14. Moreover, the support 40 has an optional retaining element 48 comprising two transversal wings 48a, 48b which protrude from the lower surface 39. The wings of the retaining element 48 extend through a slot 11 in the guiding plate 40 and face the lower surface 15 of the guiding plate 14. Therefore, the retaining element 48 and the guiding plate 14 guide the support 40 in its sliding movement towards the storage position. It should be noticed that the slot 11 split the guiding plate 14, and in particular the upper surface 13 of the guiding plate 14 in two portions 13a, 13b.

Moreover, the support 40 has two bevelled lateral walls 45, 46 facing and parallel to the respective bevelled lateral walls 16, 17 of the storage unit 10 and furthermore the retaining element 48 extends in a substantially rectilinear portion of the slot 11 of the guiding plate 14. The lateral walls 45, 46 extend substantially perpendicularly to the transversal direction Y, but slightly angled so that lateral walls 45, 46 converge one towards the other towards the distal end 40*b* of the support 40. So, between the storage position and the exit position, the support 40 is substantially prevented from translating along the transversal direction Y and from rotation around the elevation direction Z relative to the storage unit 10.

Therefore, the breathing mask 50, and in particular the support 40, is guided in translation along the sliding direction X along a distance D between the storage position and the exit position.

Beyond the exit position, the lower surface 39 of the support is away from the guiding plate 14, so that the support is not slidingly mounted on the storage unit 10 anymore.

During translation along the sliding direction X of the support 40 relative to the storage unit 10 towards the storage position, the bevelled lateral wall 45 of the support 40 gets closer to the bevelled lateral wall 16 of the storage unit 10 and the bevelled lateral wall 46 of the support 40 gets closer to the bevelled lateral wall 17 of the storage unit 10, so translation of support 40 relative to the storage unit 10 along the transversal direction Y is progressively restricted. In the storage position, the lateral walls 45, 46 of the support 40 are substantially in contact with the respective lateral walls 16, 17 of the storage unit 10.

At the distal end 40*b,* the support 40 is close to the transversal beam 30 and further has a first hole 41 and a second hole 42 extending in the sliding the sliding direction X. As shown in FIG. 5, in the storage position, the first pin 21 of the storage unit 10 is inserted in the first hole 41 of the support 40 and the second pin 22 of the storage unit 10 is inserted in the second hole 42 of the support 40.

As further shown in FIG. 5, in the storage position, the first pin 21 has a first length $l_{21}$ inserted through the hole 41 and the second pin 22 has a second length $l_{22}$ inserted through the hole 42. The first length $l_{21}$ is preferably between 1 millimeter and 3 millimeters higher than the second length $l_{22}$. Preferably, the first length $l_{21}$ is about 6 millimeters and the second length $l_{22}$ is about 4 millimeters, and the distance D between the storage position and the exit position is about 40 millimeters.

Each of the first pin 21 and the second pin 22 has a cylindrical portion 23, 26, a conical portion 24, 27 and a tip 25, 28. Each of the first hole 41 and the second hole 42 has a cylindrical portion 43, 44 and a bevelled edge extending in the sliding direction X. In the storage position, the cylindrical portion 43 of the first hole 41 surrounds the cylindrical portion 23 of the first pin 21 and the cylindrical portion 44 of the second hole 42 surrounds the cylindrical portion 24 of the second pin 22.

The cylindrical portion 23 of the first pin 21 has a first circular external section $S_{21}$, the cylindrical portion 24 of the second pin 22 has a second circular external section $S_{22}$, the cylindrical portion 43 of the first hole 41 has a first internal section $S_{41}$ and the cylindrical portion 44 of the second hole 42 has a second circular internal section $S_{42}$. The diameter of the first external section $S_{21}$ and the diameter of the second external section $S_{22}$ are preferably close to 3 millimeters. The clearance 74 between the diameter of the second external section $S_{22}$ and the diameter of the second internal section $S_{42}$ is preferably between 0.01 millimeter and 0.5 millimeter.

The clearance 72 between the first external section $S_{21}$ and the diameter of the first internal section $S_{41}$ is preferably between 0.01 millimeter and 0.5 millimeter along the elevation direction Z and between 0.5 millimeter and 2 millimeters along the transversal direction. More accurately, the first internal section $S_{41}$ is oblong and elongated along the transversal direction Y. In the elevation direction Z, the first internal section $S_{41}$ is preferably between 0.01 millimeter and 0.5 millimeter greater than the diameter of the first external section $S_{21}$ whereas in the transversal direction Y, the first internal section $S_{41}$ is preferably between 0.5 millimeter and 2 millimeters greater than the diameter of the first external section $S_{21}$.

However, what is essential is to minimise the portion of the clearance 72 between the top of the first pin 21 and the top of the first hole 41 and the portion of the clearance 74 between the top of the second pin 22 and the top of the second hole 42, in order to maintain the lower surface 39 of the support 40 in contact with the upper surface 13 of the guiding plate 40, at the distal end 40*b* when the breathing mask 50 is in the storage position, even in case of high acceleration/deceleration.

Advantageously, the pins 21, 22 are in metallic material, preferably in steel, and the support 40, at least the holes 41, 42, is in plastic material, preferably in polypropylene.

The breathing mask 50 is retained in the storage position by a releasable securing device 60 disposed near the proximal end 40*a* of the support 40. The securing device 60 includes the lever 62 and the protruding portion 38.

Figure 3:
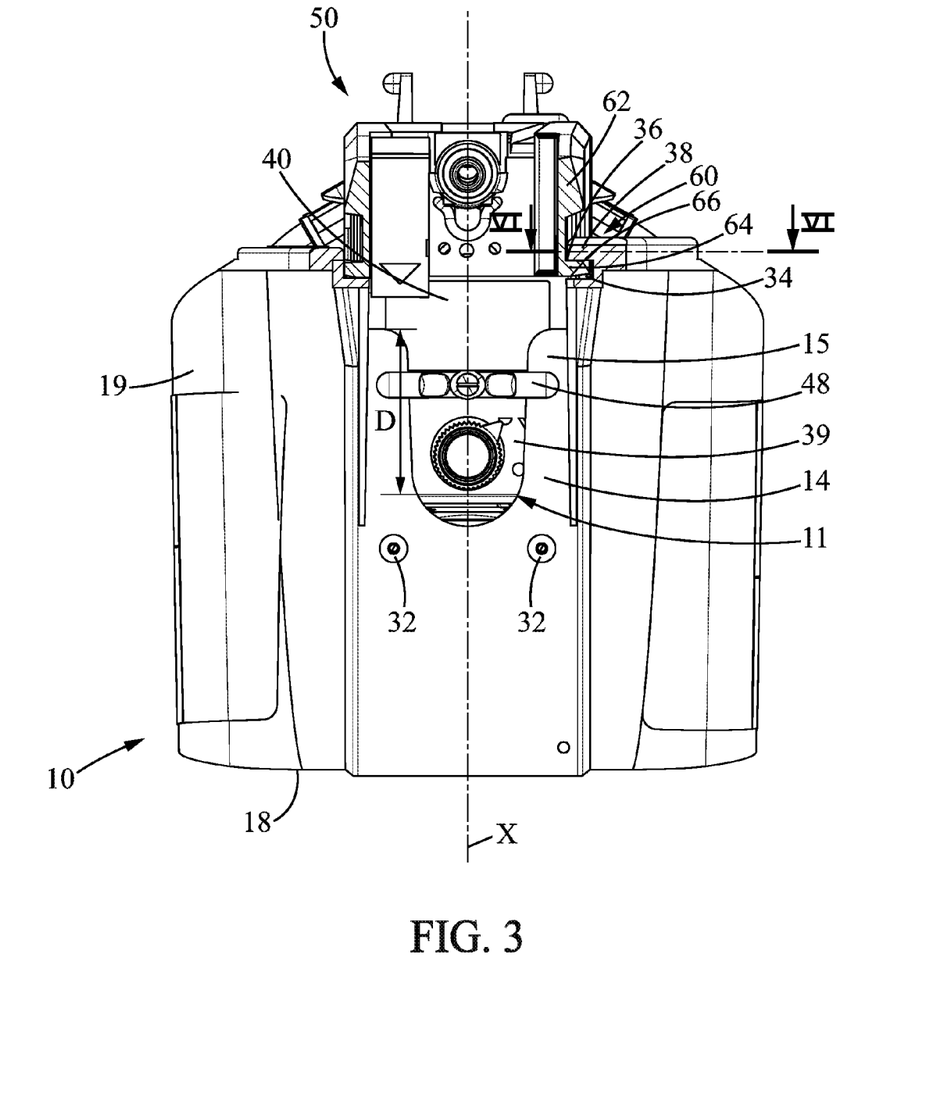
FIG. 3 shows the first embodiment of breathing assembly in section along the line referenced III-Ill in FIG. 4.
Figure 4:
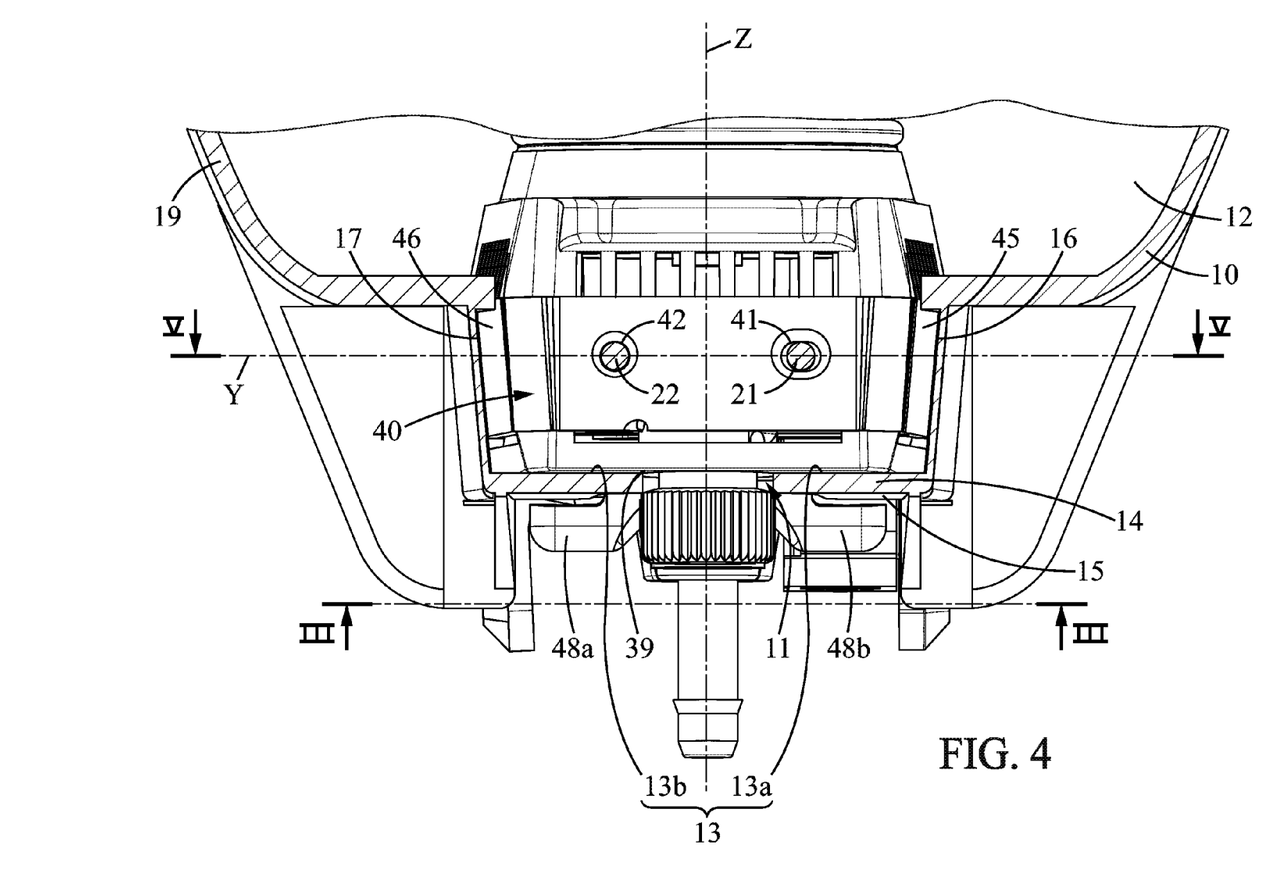
FIG. 4 shows the first embodiment of breathing assembly in section along the line referenced IV-IV in FIG. 5.

As shown in FIGS. 3 and 6, when the lever 62 is in the secure state, a lateral abutment portion 64 of the lever 62 is inserted in the notch 34. The lateral abutment portion 64 of the lever 62 has a surface extending substantially perpendicularly to the sliding direction X and facing a surface of the protruding portion 38 of the storage unit 10 extending substantially perpendicularly to the sliding direction X. Therefore, the support 40 is prevented from translating relative to the storage unit 10 along the sliding direction X towards the exit position by abutment of the abutment portion 64 of the lever 62 against the protruding portion 38 of the storage unit 10, when the lever 62 is in the secure state.

The abutment portion 64 of the lever 62 has a lateral edge 66 having a length $L_{66}$ (referenced in FIG. 7) and being substantially vertical in the secure state. The protruding portion 38 of the storage unit 10 has a lateral edge 36, substantially vertical, having a length $L_{36}$ (referenced in FIG. 7). The length $L_{66}$ of the lateral edge 66 is preferably about 30 millimeters whereas the length $L_{36}$ of the lateral edge 36 is preferably about 10 millimeters.

When the lever is in the secure state, the lateral edge 66 of the lever 62 is substantially parallel to the lateral edge 36 of the storage unit 10 and the distance between the lateral edge 66 of the lever 62 and the lateral edge 36 of the storage unit 10 is substantially 4 millimeters. So, the surface of contact between the abutment portion 64 of the lever 62 and the protruding portion 38 of the storage unit 10 is substantially a rectangle having short sides of about 4 millimeters extending along the transversal direction and long sides of 10 millimeters along the elevation direction Z, said rectangle being distant from the release axis 70 of more than 20 millimeters, preferably substantially 40 millimeters.

As shown in particular in FIGS. 6 and 7, the lever 62 further as a bottom abutment portion 68 with extends substantially perpendicularly to the elevation direction Z and, in the secure state, the bottom abutment portion 68 of the lever faces a bottom abutment surface 37 of the protrusion 38 extending substantially perpendicularly to the elevation direction Z. Therefore, when the lever is in the secure state, the lower surface 39 of the support 40 is substantially maintained is contact with the upper surface 13 of the guiding plate, at the proximal end 40a, and the support 40 is prevented from translating relative to the storage unit 10 along the elevation direction Z.

In the storage position, the breathing mask 50 is also prevented from translation along the elevation direction Z, from rotation around the sliding direction X and from rotation around the transversal direction Y relative to the storage unit 10, because the lower surface 39 of the support 40 rests on the upper surface 13 of the guiding plate.

As shown in FIG. 7, by rotation of the lever 62 around the release axis 70, the lever is moved towards the release state. In the release state, the lateral abutment portion 64 of the lever 62 is away from the notch and distant from the protruding portion 38 of the storage unit 10 along the transversal direction Y. So, the lateral abutment portion 64 of the lever 62 does not face the protruding portion 38 of the storage unit 10 anymore along the sliding direction X. Therefore, in the release state, the secure device 60 does not prevent the breathing mask 50 from sliding towards the exit position relative to the storage unit 10 along the sliding direction X.

In the release state, the bottom abutment portion 68 of the lever 62 is away from the bottom abutment surface 37 of the protrusion 38 along the elevation direction Z.

Figure 8:
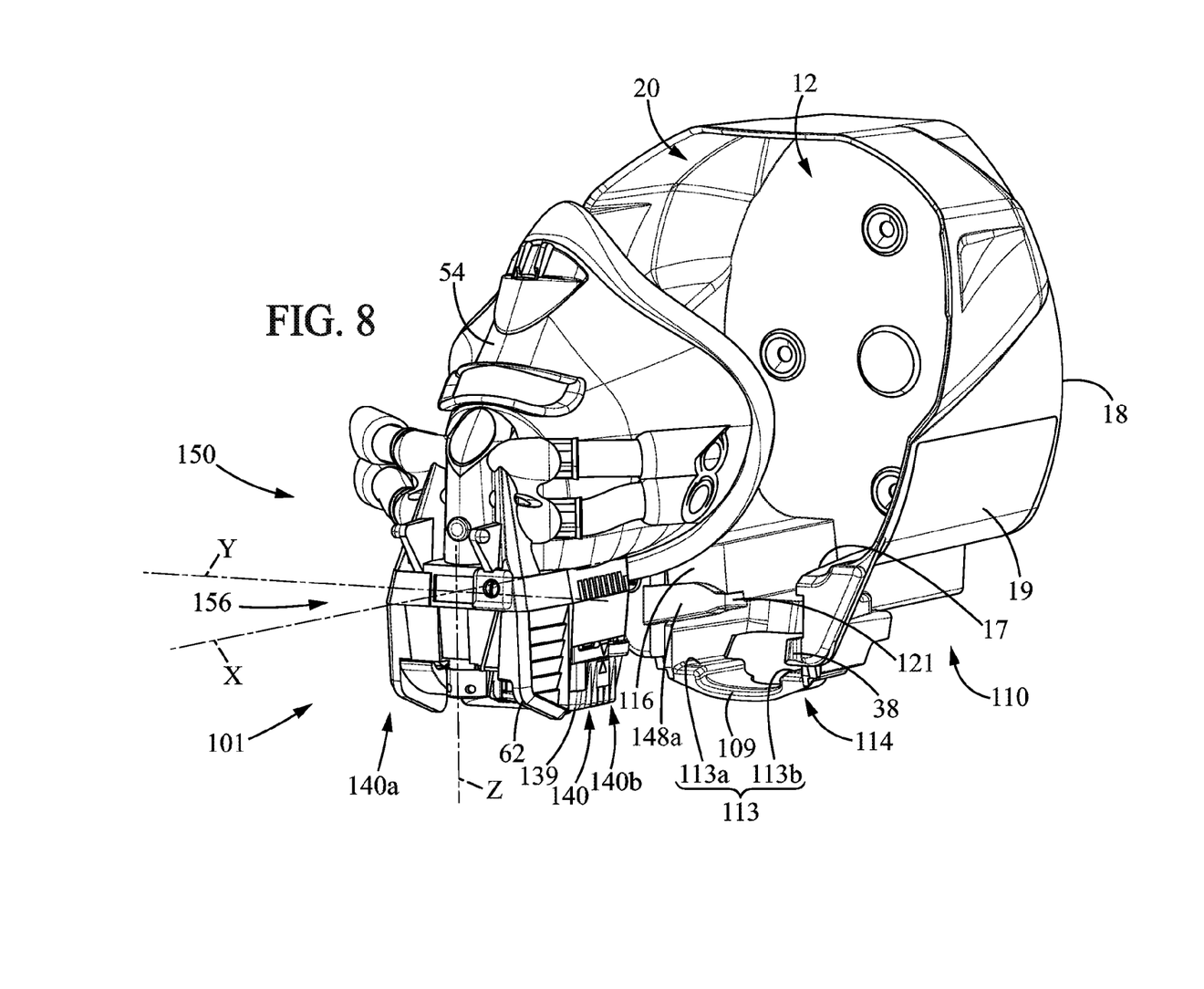
FIG. 8 shows in exploded perspective a second embodiment of a breathing assembly in accordance with the invention.
Figure 9:
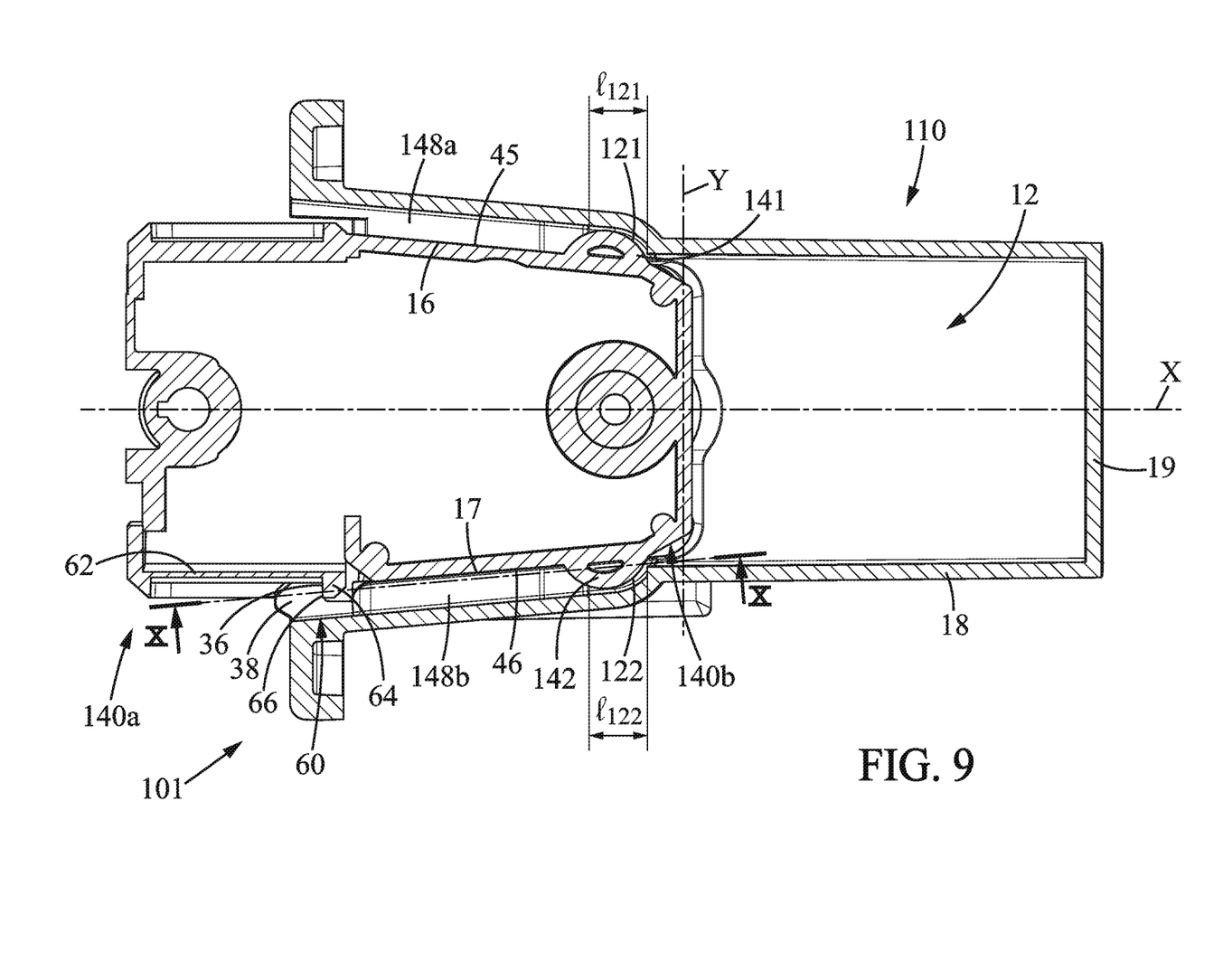
FIG. 9 shows the second embodiment of breathing assembly in section along the line referenced IX-IX in FIG. 10.
Figure 10:
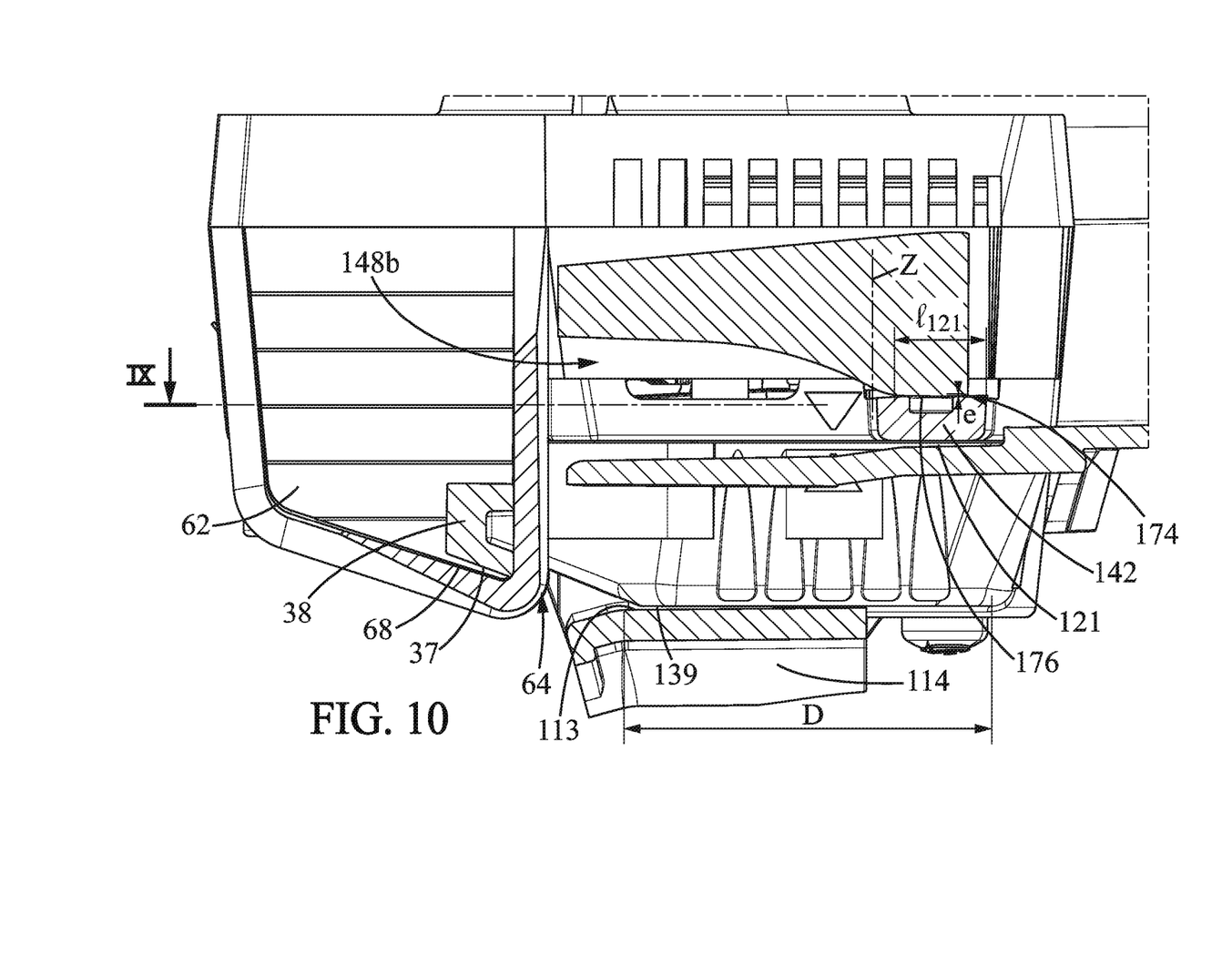
FIG. 10 shows the second embodiment of breathing assembly in section along the line referenced X-X in FIG. 9.

FIGS. 8 to 10 show a second embodiment 101 of breathing assembly in accordance with the invention. The elements which are identical in the first embodiment and in the second embodiment have their referenced unchanged. The elements of the second embodiment which are different but have a similar or identical function as in the first embodiment have a referenced increased by 100.

The breathing assembly 101 essentially differs from the breathing assembly 1 in that the support 140 of the on-demand regulator 156 of the breathing mask 140 has two protrusions 141, 142 instead of the holes 41, 42 and the storage cup 110 has two slots 121, 122 instead of two pins 21, 22.

Otherwise, the protrusions 141, 142 protrude from the lateral walls 45, 46 along the transversal direction Y, in opposite directions, proximate the distal end 140b of the support 140.

As shown in particular in FIG. 10, when the breathing mask 150 is in the storage position, the lower surface 139 of the support 140 rests on the two portions 113a, 113b of the upper surface 113 of the guiding plate 114, the protrusions 141, 142 are received in the slots 121, 122 and the protrusion 141, 142 face respective maintaining surfaces 176 (only one is represented) of the storage cup 110 along the elevation direction Z. The maintaining surfaces 176 delimit the top of the slots 121, 122. There is preferably a small (non null) clearance 174 having a thickness e between 0.1 millimeter and 0.5 millimeter above the protrusions 141, 142, between the protrusions 141, 142 and the respective maintaining surfaces 176 along the elevation direction Z.

Therefore, the support 140 is maintained along the elevation direction Z at the distal end 140b (with a very low play), even in case of high acceleration/deceleration, the lower surface 139 of the support being maintained in contact of the upper surface 113 of the guiding plate 114 thanks to the protrusion 141, 142 engaging the slots 121, 122.

As shown in particular in FIG. 9, preferably, when the breathing mask 150 is in the storage position, there is a small gap between the protrusion 141, 142 and the storage box 110 along the transversal direction Y.

As shown in particular in FIG. 10, each of the protrusions 141, 142 faces the respective maintaining surface 176 delimiting the top of the respective slot 121, 122 along a length $l_{121}$, $l_{122}$ along the sliding direction X. Preferably, said length $l_{121}$, $l_{122}$ is close to 9 millimeters. The length $l_{121}$ and the length $l_{122}$ could differ a bit, as the length $l_{21}$ and the length $l_{22}$ of the breathing assembly 1.

The lower surface 139 of the support 140 slides in contact with the upper surface 113 of the guiding plate 114 along a distance D along the sliding direction X, between the storage position and the exit position, preferably close to 40 millimeters.

Moreover, the breathing assembly 101 comprises two grooves 148a, 148b instead of the retaining element 48 of the breathing assembly 101, in order to guide the support 140 from the exit position towards the storage position, the protrusion 141, 142 engaging the grooves 148a, 148b and then engaging the slots 121, 122.

Finally, the breathing assembly 101 differs from the breathing assembly 1 in that it further comprises a rigid bridge 109 extending along the transversal direction Y and connecting the two portions 113a, 113b of the upper surface 113 of the guiding plate 114 for strengthening the guiding plate 114 at the proximal end 140a. Preferably, the bridge 109 includes ribs.

As above described, when the breathing mask 150 is in the storage position and the secure device 60 is in the secure state, the support 140 is prevented from sliding along the sliding direction X and from moving away from upper surface 113 of the guiding plate 114 along the elevation direction Z at the proximal end 140a by abutment of the lever 62 against the protrusion 38.

Of course, the scope of the invention is not limited to the above described embodiment shown for illustrative purpose. For example, the lever 62 may be slidingly mounted on the support 40 instead of being rotatively mounted on the support 40. In an alternative solution, the release securing device 60 could for instance comprise an electro-magnet releasably retaining the breathing mask 50 in the storage position.

The invention claimed is:

1. A breathing assembly for aircraft comprising:
   a storage unit to be fixed to the aircraft, having a receptacle and an opening, the storage unit further having a guiding surface extending perpendicularly to an elevation direction,
   a breathing mask to be donned by an aircraft crewmember, the breathing mask comprising a rigid support having a sliding surface adapted to slide in contact with the guiding surface of the storage unit, along a sliding direction, between a storage position and an exit position, the sliding direction being perpendicular to the elevation direction, the support extends along the sliding direction between a proximal end and a distal end, and
   a releasable securing device having a secure state and a release state, wherein when in the secure state the securing device prevents the support from sliding from the storage position towards the exit position and when in the release state the securing device allows the support to slide from the storage position towards the exit position, wherein:
the support further has at least one maintaining element disposed at the distal end of the support along the sliding direction,
the storage unit further has a maintaining element,
in the storage position, the sliding surface of the support is prevented from moving away from the guiding surface of the storage unit along the elevation direction at the distal end by engagement of the maintaining element of the support with the maintaining element of the storage unit.

2. A breathing assembly according to claim 1 wherein the maintaining element of the support engages the maintaining element of the storage unit along a maintaining length along the sliding direction, and the storage position is spaced from the exit position by a distance at least three times as long as said maintaining length.

3. A breathing assembly according to claim 2 wherein the maintaining length is lower than 15 millimeters, preferably lower that 10 millimeters.

4. A breathing assembly according to claim 1 wherein in the storage position, a clearance lower than 0.5 millimeter, preferably lower than 0.1 millimeter, along the elevation direction is placed between the maintaining element of the support and the maintaining element of the storage unit.

5. A breathing assembly according to claim 1 wherein:
the securing device comprises a lever and a protruding portion, and
in the storage position of the support and in the secure state of the securing device, the lever has an abutment portion which abuts against the protruding portion along the sliding direction.

6. A breathing assembly according to claim 5 wherein in the storage position of the support and in the secure state of the securing device, the sliding surface of the support is prevented from moving away from the guiding surface of the storage unit along the elevation direction at the proximal end by engagement of the protruding portion with the lever.

7. A breathing assembly according to claim 5 wherein:
the abutment portion of the lever has an edge extending substantially parallel to an edge of the protruding portion,
in the secure state of the securing device, along the sliding direction, the edge of the abutment portion of the lever faces the protruding portion and the edge of the protruding portion faces the abutment portion of the lever,
in the secure state of the securing device, in cross section perpendicular to the sliding direction, the whole edge of the abutment portion of the lever is separated by at least 1 millimeter from the edge of the protruding portion.

8. A breathing assembly according to claim 7 wherein the edge of the abutment portion of the lever has a length at least twice as long as the length of the edge of the protruding portion.

9. A breathing assembly according to claim 5 wherein the lever is pivotably mounted on the support around a release axis parallel to the sliding direction, and the protruding portion is fixed to the storage unit.

10. A breathing assembly according to claim 5 wherein the breathing mask has a harness and the lever generates the inflation of the harness when the lever is in the release state.

11. A breathing assembly according to claim 1 wherein the guiding surface of the storage cup comprises two distant portions connected one to the other through a rigid bridge.

12. A breathing assembly according to claim 1 wherein one amongst the maintaining element of the storage unit and the maintaining element of the support is a slot extending in the sliding direction and the other is a protrusion protruding in a transversal direction perpendicular to the sliding direction and to the elevation direction, the protrusion engaging the groove in the storage position.

13. A breathing assembly according to claim 12 wherein:
the breathing assembly comprises at least:
two protrusions: a first protrusion and a second protrusion protruding along the transversal direction in opposite directions, and
two slots: a first slot and a second slot and,
in the storage position the first protrusion engages the first slot and the second protrusion engages the second slot,
in the exit position the first protrusion extends away from the first slot and the second protrusion extends away from the second slot.

14. A breathing assembly according to claim 1 wherein one amongst the maintaining element of the storage unit and the maintaining element of the support is a pin extending in the sliding direction and the other is a hole, and the pin is inserted in said hole when the rigid support is in the storage position.

15. A breathing assembly according to claim 14 wherein:
the breathing assembly comprises at least:
two pins: a first pin and a second pin and,
two holes: a first hole and a second hole, and
in the storage position the first pin extends through the first hole and the second pin extends through the second hole,
in the exit position the first pin extends away from the first hole and the second pin extends away from the second hole.

16. A breathing assembly according to claim 15 wherein:
in the storage position, the first has a first length extending through the first hole and the second pin has a second length extending through the second hole, and
the first length is at least ten percent longer than the second length.

17. A breathing assembly according to claim 15 wherein:
the first pin has a first external section, the first hole has a first internal section, and
the second pin has a second external section which is circular, the second hole has a second internal section which is elongated along a transversal direction perpendicular to the sliding direction and to the elevation direction.

18. A breathing assembly according to claim 14 wherein:
the pin has a cylindrical portion, a tip and a conical portion extending between the cylindrical portion and the tip, and
the hole has a cylindrical portion surrounding the cylindrical portion of the pin when the support is in the storage position.

19. A breathing assembly according to claim 14 wherein the pin is in metallic material and the support is in plastic material.

20. A breathing assembly according to claim 14 wherein the pin is tight fitted in a separate beam fixed to the storage unit.

21. A breathing assembly according to claim 1 wherein:
the support further has two bevelled lateral walls disposed on opposite sides of the support along a transversal direction perpendicular to the sliding direction and to the elevation direction,
the storage unit further has two respective bevelled lateral walls, and in the storage position, the bevelled lateral walls of the support are parallel to and substantially in contact with the respective bevelled lateral walls of the storage unit.

22. A breathing assembly according to claim 1 further comprising a seat and wherein the storage unit is fixed to the seat.

\* \* \* \* \*